(12) United States Patent
Kawamura et al.

(10) Patent No.: US 9,280,539 B2
(45) Date of Patent: Mar. 8, 2016

(54) SYSTEM AND METHOD FOR TRANSLATING SPEECH, AND NON-TRANSITORY COMPUTER READABLE MEDIUM THEREOF

(71) Applicant: KABUSHIKI KAISHA TOSHIBA, Minato-ku, Tokyo (JP)

(72) Inventors: Akinori Kawamura, Tokyo (JP); Kazuo Sumita, Kanagawa-ken (JP); Satoshi Kamatani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/487,267

(22) Filed: Sep. 16, 2014

(65) Prior Publication Data
US 2015/0081274 A1  Mar. 19, 2015

(30) Foreign Application Priority Data

Sep. 19, 2013  (JP) ................................. 2013-194020

(51) Int. Cl.
*G06F 17/28*  (2006.01)
*G10L 15/26*  (2006.01)

(52) U.S. Cl.
CPC ............. *G06F 17/289* (2013.01); *G10L 15/26* (2013.01); *G06F 17/28* (2013.01)

(58) Field of Classification Search
CPC ...... G06F 17/289; G06F 9/4448; G06F 17/28
See application file for complete search history.

(56) References Cited

U.S. PATENT DOCUMENTS

| 7,369,984 B2 * | 5/2008 | Fairweather ............ G06F 8/427 704/8 |
| 8,108,509 B2 * | 1/2012 | Chatani ................... A63F 13/12 704/258 |

(Continued)

FOREIGN PATENT DOCUMENTS

| JP | 2001-251429 | 9/2001 |
| JP | 2002-027039 | 1/2002 |

(Continued)

OTHER PUBLICATIONS

"Evaluation of a Simultaneous Interpretation System for Continuous-Speech Conversation", Information Processing Society of Japan (IPSJ) SIG Technical Reports, vol. 2013-HCI-151, No. 17, 1-99, Jan. 25, 2013.

*Primary Examiner* — Matthew Baker
(74) *Attorney, Agent, or Firm* — Amin, Turocy & Watson, LLP

(57) ABSTRACT

A first speech input device captures a speech of a first language. A first speech output device outputs another speech of the first language. A second speech input device captures a speech of a second language. A second speech output device outputs another speech of the second language. In a speech recognition/translation server, a first speech recognition device receives a first utterance speech of the first language from the first speech input device, and recognizes the first utterance speech. A first machine translation device consecutively translates the first language of the recognition result into the second language without waiting completion of the first utterance speech. A first speech synthesis device generates a second speech of the translation result. A first output adjustment device outputs the first utterance speech and the second speech to the second speech output device by adjusting a volume of the first utterance speech to be smaller than a volume of the second speech.

12 Claims, 8 Drawing Sheets

(56) References Cited

U.S. PATENT DOCUMENTS

| | | | |
|---|---|---|---|
| 8,311,798 B2 | 11/2012 | Pedre | |
| 8,527,258 B2* | 9/2013 | Kim | G10L 15/26 704/2 |
| 8,775,156 B2* | 7/2014 | Lebeau | G06F 17/28 704/2 |
| 2007/0016401 A1* | 1/2007 | Ehsani | G10L 15/005 704/9 |
| 2008/0027705 A1 | 1/2008 | Koga | |
| 2008/0077390 A1* | 3/2008 | Nagao | G06F 17/289 704/7 |
| 2010/0135478 A1* | 6/2010 | Wald | G06F 17/289 379/202.01 |
| 2010/0169073 A1* | 7/2010 | Almagro | G10L 15/26 704/3 |
| 2010/0185432 A1* | 7/2010 | Almagro | H04R 5/033 704/2 |
| 2010/0250231 A1* | 9/2010 | Almagro | G06F 17/289 704/2 |
| 2010/0283829 A1* | 11/2010 | De Beer | H04N 7/152 348/14.09 |
| 2011/0270601 A1* | 11/2011 | Karapetian | G10L 13/00 704/4 |
| 2013/0103384 A1* | 4/2013 | Hunter | G06F 17/28 704/3 |
| 2013/0211818 A1 | 8/2013 | Sakamoto et al. | |
| 2014/0303958 A1* | 10/2014 | Lee | G06F 17/289 704/2 |
| 2014/0337007 A1* | 11/2014 | Waibel | G06F 17/289 704/3 |
| 2014/0358516 A1* | 12/2014 | Lin | G06F 17/289 704/2 |
| 2015/0120277 A1* | 4/2015 | Song | G10L 15/26 704/2 |

FOREIGN PATENT DOCUMENTS

| | | |
|---|---|---|
| JP | 2008-032834 | 2/2008 |
| JP | 2011-221237 | 11/2011 |
| JP | 2013-164515 | 8/2013 |
| JP | 2013-167806 | 8/2013 |

* cited by examiner

SYSTEM AND METHOD FOR TRANSLATING SPEECH, AND NON-TRANSITORY COMPUTER READABLE MEDIUM THEREOF

CROSS-REFERENCE TO RELATED APPLICATION

This application is based upon and claims the benefit of priority from Japanese Patent Application No.2013-194020, filed on Sep. 19, 2014; the entire contents of which are incorporated herein by reference.

FIELD

Embodiments described herein relate generally to a system and a method for translating speech, and a non-transitory computer readable medium thereof.

BACKGROUND

Practical application of a speech translation system is progressing. For example, NTT DOCOMO, INC. started a speech translation service such as "hanashite honyaku" in 2012. This service supports not only face-to-face speech translation service but also non-face-to-face speech translation service. In the face-to-face speech translation service, two users commonly utilize one speech translation terminal, and conversations of the two users who are mutually facing are subjected to speech translation. Furthermore, in the non-face-to-face speech translation service, dialogues of two users who are remotely located by a call device such as a telephone are subjected to speech translation.

In the face-to-face speech translation service, on a speech translation terminal commonly owned by two users, an utterance start button and an utterance completion button are prepared for respective languages of the two users. When two users who speak different languages (For example, Japanese, English) converse in respective language, after pushing the start button, the two users utters in the respective languages. Then, when a first user of the two users completes the utterance, the first user pushes the utterance completion button. Here, instead of the utterance completion button, the first user's utterance may be automatically completed by detecting a silent interval.

As a result, on a screen of the speech translation terminal, a speech recognition result and a translation result are displayed as character strings. Furthermore, the translation result is outputted as a speech via a speaker of another party (a second user of the two users). Now, the second user who watched the screen utters by operating in the same way. Here, this translation result is outputted via a speaker of the first user. Thus, by repeating similar operations, the two users can converse via the speech translation terminal.

In the non-face-to-face speech translation service, the first user A operates such as [pushing the utterance start button]→[uttering]→[pushing the utterance completion button]. In this case, the second user B (another party) can hear via a telephone such as [notification sound "Pi!" by the user A's pushing the utterance start button]→[the user A's utterance]→[notification sound "Pi!" by the user A's pushing the utterance completion button]→[speech of translation result]. Then, by mutually repeating this operation, conversation by speech translation can be performed.

In this speech translation apparatus, after one user's utterance is completed, the speech translation result is outputted via a display or a speaker. Accordingly, in comparison with communication by regular conversation, it takes a long time for the other user to understand the one user's intension.

In order to solve this problem, face-to-face simultaneous translation system is proposed in following references.

(Reference 1) JP Pub. No.2002-27039

(Reference 2) "Evaluation of a Simultaneous Interpretation System for Continuous-Speech Conversation", Information Processing Society of Japan (IPSJ) SIG technical reports, 2013-HCI-151 (17), 1-99, 2013-01-25

In the face-to-face simultaneous translation system, while two users are uttering, a translation unit is automatically detected therefrom, and the translation result is displayed by following the user's utterance. In this case, without waiting completion of the user's utterance, the translation result is notified. As a result, time necessary for one user to understand another user's intention is reduced, and the users can communicate smoothly.

In the simultaneous speech translation system, face-to-face speech translation service is imagined. Even if the translation result is consecutively displayed while uttering, no problems occur. However, in non-face-to-face speech translation service to which the simultaneous speech translation system is applied, when a speech of the translation result (consecutively translated) is outputted by overlapping with an original speech of a speaker (user A), it is hard for a listener (user B) to hear the speech of the translation result.

In order to solve this problem, if the speech of the translation result is outputted after the speaker's utterance is completed, the listener easily hears the speech of the translation. However, in this method, it takes a long time for the listener to understand the speaker's intension. As a result, communication between users A and B cannot be smoothly realized.

Furthermore, a method to avoid overlap of speeches by outputting not the speaker's original speech but the speech of the translation result can be considered. In this method, the listener hears only the speech of the translation result without the speaker's original speech. Accordingly, it is hard for the listener to synchronize the utterance timing. For example, when the speech of the translation result is paused, two cases are considered. As a first case, after the speaker's utterance is completed, it is under a condition to wait the listener's utterance. As a second case, the speaker is continually uttering with a pause. As to two users (speaker and listener) who are remotely located, it is difficult for them to understand their utterance turn in above two cases. As a result, their conversation is not smooth.

DETAILED DESCRIPTION

According to one embodiment, a speech translation system includes a first speech apparatus, a second speech apparatus, and a speech recognition/translation server. The first speech apparatus includes a first speech input device that captures at least a speech of a first language, and a first speech output device that outputs another speech of the first language. The second speech apparatus includes a second speech input device that captures at least a speech of a second language, and a second speech output device that outputs another speech of the second language. The speech recognition/translation server performs speech translation between the first speech apparatus and the second speech apparatus. The server includes a first speech recognition device, a first machine translation device, a first speech synthesis device, and a first output adjustment device. The first speech recognition device receives a first utterance speech of the first language from the first speech input device, and recognizes the first utterance speech. The first machine translation device consecutively translates the first language of the recognition result into the second language without waiting completion of the first utterance speech. The first speech synthesis device generates a second speech of the translation result. The first output adjustment device outputs the first utterance speech and the second speech to the second speech output device by adjusting a volume of the first utterance speech to be smaller than a volume of the second speech.

Various embodiments will be described hereinafter with reference to the accompanying drawings.

Figure 1:
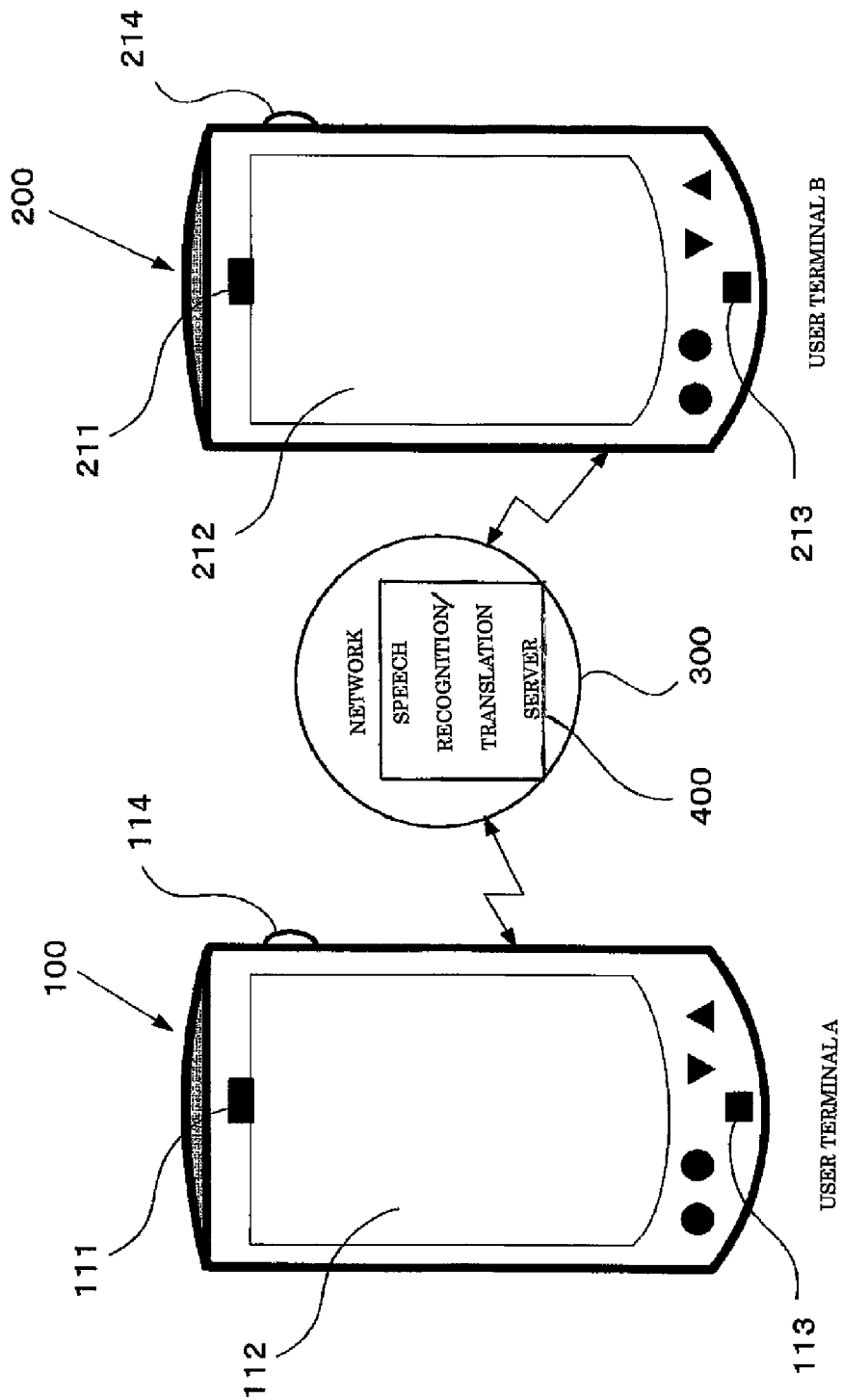
FIG. 1 is a schematic diagram of entire component of a speech translation system according to various embodiments.

FIG. 1 is a schematic diagram of entire component of a speech translation system according to the present embodiment. A user terminal A (100) is a first speech device. As the user terminal A (100), a portable housing equips a speaker 111, a display 112, a microphone 113, and a speech input button 114. Similarly, a user terminal B (200) is a second speech device. As the user terminal B (200), a portable housing equips a speaker 211, a display 212, a microphone 213, and a speech input button 214. The speakers 111 and 211 output a translation result (from this device) by speech. The displays 112 and 212 display a speech recognition result and the translation result. The microphones 113 and 213 capture user's utterance speech. The speech input buttons 114 and 214 indicate to start to capture the utterance speech.

The user terminal A (100) and the user terminal B (200) are connected via a speech recognition/translation server 400 on a network 300. By this connection, the speech translation system using a portable electric device such as a smart phone is provided. The network 300 may be any of wireless communication and wired-communication. Moreover, the speech translation system of the present embodiment is not limited to component of FIG. 1. For example, this system can be applied to a television conference system using a personal computer.

The First Embodiment

Figure 2:
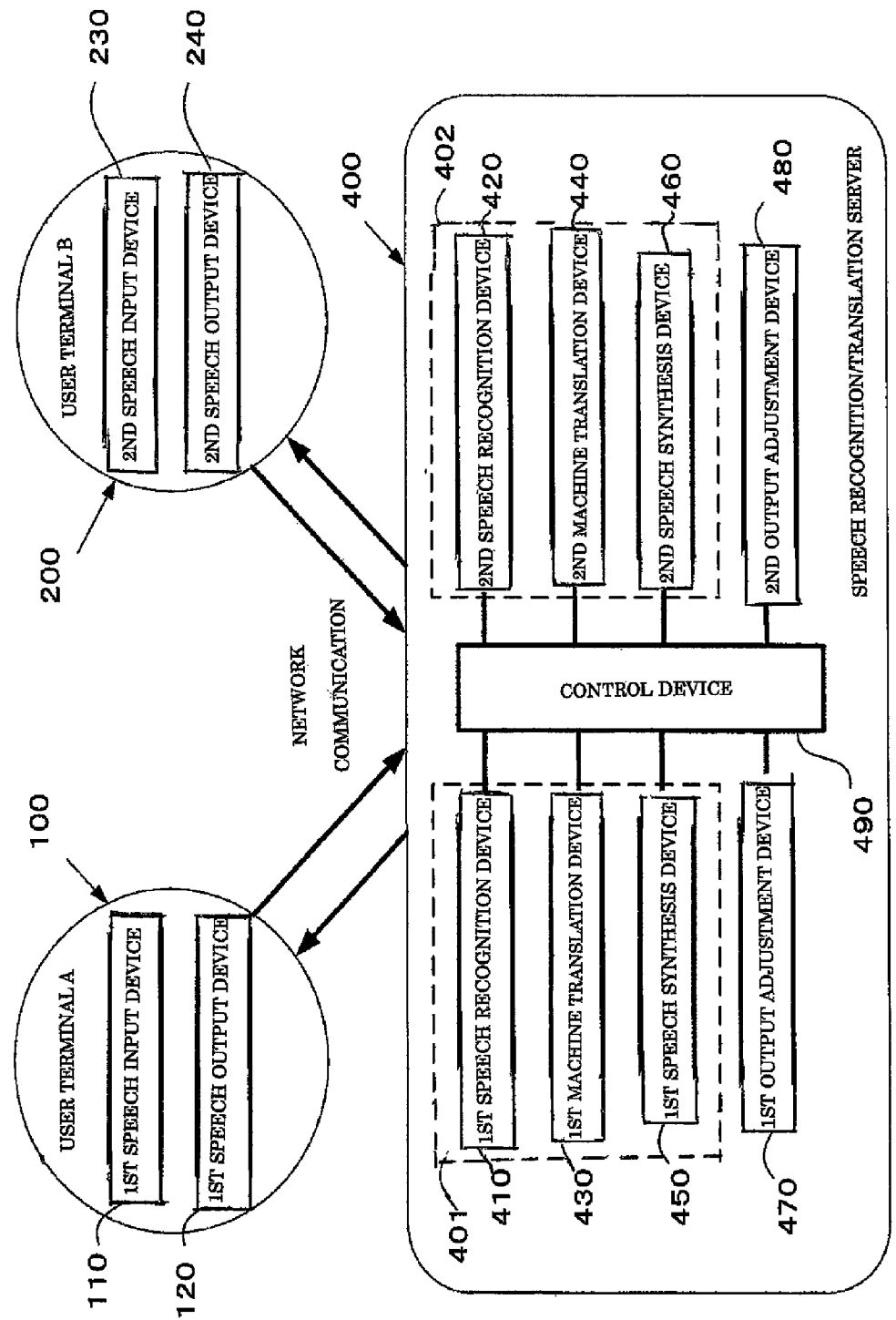
FIG. 2 is a block diagram of component of a principle part of the speech translation system.

FIG. 2 is a block diagram of a principle component of the speech translation system according to the first embodiment.

In this speech translation system, as to a user A who speaks a first language (For example, Japanese) and a user B who speaks a second language (For example, English), speech translation is performed therebetween. In order for users A and B who are remotely located to communicate bidirectionally, the user terminal A (100) equips a first speech input device 110 and a first speech output device 120. Similarly, the user terminal B (200) equips a second speech input device 230 and a second speech output device 240. The first speech input device 110 is equivalent to the microphone 113 of FIG. 1, and the first speech output device 120 is equivalent to the speaker 111 of FIG. 1. Furthermore, the second speech input device 230 is equivalent to the microphone 213 of FIG. 1, and the second speech output device 240 is equivalent to the speaker 211 of FIG. 1.

The speech recognition/translation server 400 (installed onto the network between both terminals) includes two speech translation apparatuses 401 and 402, a first output adjustment device 470, a second output adjustment device 480, and a control device 490.

A speech translation apparatus 401 includes a first speech recognition device 410, a first machine translation device 430, and a first speech synthesis device 450. The speech translation apparatus 401 recognizes a first speech received, and outputs a second speech of the translation result. Furthermore, a speech translation apparatus 402 includes a second speech recognition device 420, a second machine translation device 440, and a second speech synthesis device 460. The speech translation apparatus 402 recognizes a second speech received, and outputs a first speech of the translation result. Hereinafter, the detail processing will be explained.

The first speech recognition device 410 receives and captures a speech of the first language sent from the first speech input device 110 of the user terminal A (100). The first machine translation device 430 translates a speech recognition result of the first language (recognized by the first speech recognition device 410) into the second language by referring to a translation dictionary (not shown in FIG. 2), and outputs the translation result to the first speech synthesis device 450. The first speech synthesis device 450 generates a speech synthesis signal of the translation result of the second language (inputted from the first machine translation device 430), and outputs the speech synthesis signal to the second speech output device 240 of the user terminal B (200).

On the other hand, the second speech recognition device 420 receives and captures a speech of the second language sent from the second speech input device 230 of the user terminal B (200). The second machine translation device 440 translates a speech recognition result of the second language (recognized by the second speech recognition device 420) into the first language by referring to a translation dictionary (not shown in FIG. 2), and outputs the translation result to the second speech synthesis device 460. The second speech synthesis device 460 generates a speech synthesis signal of the translation result of the first language (inputted from the second machine translation device 440), and outputs the speech synthesis signal to the first speech output device 120 of the user terminal A (100).

Here, the translation result from the first machine translation device 430 is outputted to the first speech synthesis device 450. However, the translation result may be outputted to the second speech synthesis device 460. Similarly, the translation result from the second machine translation device 440 is outputted to the second speech synthesis device 460. However, the translation result may be outputted to the first speech synthesis device 450.

The first output adjustment device 470 adjusts a volume of an utterance speech of the second language and a volume of the speech synthesis signal of the first language (outputted from the second speech synthesis device 460). Similarly, the second output adjustment device 480 adjusts a volume of an utterance speech of the first language and a volume of the speech synthesis signal of the second language (outputted from the first speech synthesis device 450). The control device 490 controls timing of all of these devices. Moreover, the user terminal A (100), the user terminal B (200), and the speech recognition/translation server 400, equip a communication device (not shown in FIG. 2) to perform network communication.

Next, operation of the speech translation system of the first embodiment will be explained.

First, when the user A starts uttering in the first language (For example, Japanese), the first speech input device 110 of the user terminal A (100) captures the utterance speech. A first speech from the first speech input device 110 is passed through the speech recognition/translation server 400 on the network, and is sent to the second speech output device 240 of the user terminal B (200) by reducing a volume of the first speech.

Simultaneously, in the speech recognition/translation server 400, the first speech recognition device 410 recognizes the utterance speech of the first language (received from the first speech input device 110), and outputs the speech recognition result to the first machine translation device 430. The first machine translation device 430 translates the speech recognition result of the first language into the second language (For example, English), and outputs the translation result to the first speech synthesis device 450. In this case, for example, by the method described in Reference 2, whenever a translation unit is automatically detected, even if the user A is uttering, a second speech of the translation result is consecutively generated. The first speech synthesis device 450 generates a second speech synthesis signal of the translation result. A volume of the second speech synthesis signal is adjusted by the second output adjustment device 480. As a result, the first language uttered by the user A is translated into the second language by the speech recognition/translation server 400. A speech (having volume adjusted by the second output adjustment device 480) of this translation result is outputted to the second speech output device 240 of the user terminal B (200), and heard by the user B.

In the same way, when the user B starts uttering in the second language (For example, English), the second speech input device 230 of the user terminal B (200) captures the utterance speech. A second speech from the second speech input device 230 is passed through the speech recognition/translation server 400 on the network, and is sent to the first speech output device 120 of the user terminal A (100) by reducing a volume of the first speech.

Simultaneously, in the speech recognition/translation server 400, the second speech recognition device 420 recognizes the utterance speech of the second language (received from the second speech input device 230), and outputs the speech recognition result to the second machine translation device 440. The second machine translation device 440 translates the speech recognition result of the second language into the first language (For example, Japanese), and outputs the translation result to the second speech synthesis device 460. In this case, for example, by the method described in Reference 2, whenever a translation unit is automatically detected, even if the user B is uttering, a first speech of the translation result is consecutively generated. The second speech synthesis device 460 generates a first speech synthesis signal of the translation result. A volume of the first speech synthesis signal is adjusted by the first output adjustment device 470. As a result, the second language uttered by the user B is translated into the first language by the speech recognition/translation server 400. A speech (having volume adjusted by the first output adjustment device 470) of this translation result is outputted to the first speech output device 120 of the user terminal A (100), and heard by the user A.

Figure 3:
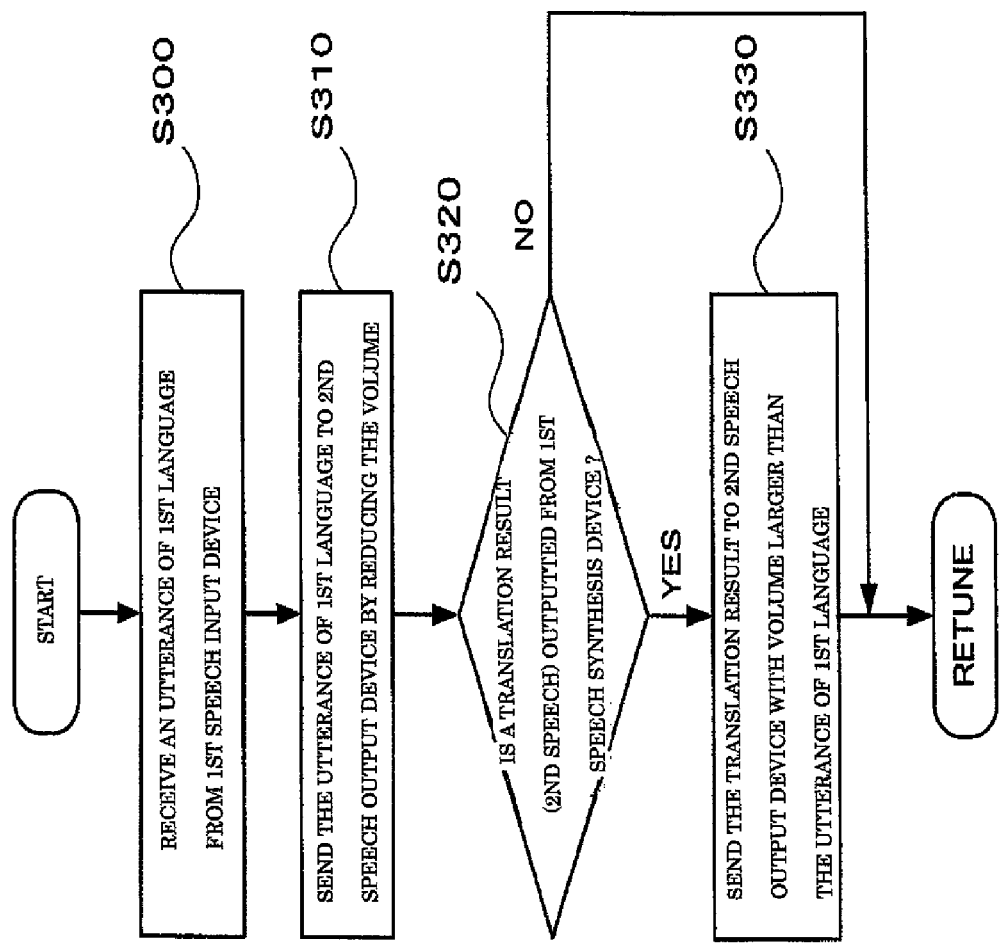
FIG. 3 is a flow chart of operation of a second output adjustment device according to a first embodiment.

FIG. 3 is a flow chart of operation of the second output adjustment device 480 in a case that the user A utters to the first speech input device 110. Furthermore, the first output adjustment device 470 executes the same operation as FIG. 3.

When the second output adjustment device 480 receives an utterance of a first speech (For example, Japanese) from the first speech input device 110 via the network (S300), the second output adjustment device 480 reduces a volume of the first speech, and outputs the first speech (having the reduced volume) to the second speech output device 240 of the user terminal B via the network (S310).

The first speech recognition unit 410 recognizes the utterance of the first speech. In response to the recognition result, the first machine translation device 430 consecutively generates a translation result with a little delay. Then, the first speech synthesis device 450 generates a second speech (For example, English) of the translation result. Next, it is checked whether the second speech of the translation result exists in the first speech synthesis device 450 (S320). If the second speech of the translation result exists, the second output adjustment device 480 adjusts so that a volume of the first speech of the first language is smaller than a volume of the second speech of the translation result (generated by the first speech synthesis device 450), and outputs the second speech (having the adjusted volume) to the user terminal B (200). In the user terminal B (200), the second speech output device 240 receives the first speech (the utterance speech) and the second speech (the translation result), and outputs in order for the user B to hear from a speaker (S330). Here, the volume of the first speech is adjusted to be small. After S330, or if the second speech does not exist at S320, processing is returned, and next speech input is waited.

In this operation, by following the utterance speech (having a small volume) of the first language (For example, Japanese) with a little delay, the user B can hear the second speech (having a larger volume) of the translation result of the second language (For example, English) overlapped therewith.

As a result, the user B can hear the utterance speech of the first language of the user A. Accordingly, the user B can naturally perceive that the user A waits the user B's utterance by stopping the user A's utterance. Furthermore, a volume of the utterance speech of the first language is smaller than a volume of the second speech of the translation result. Accordingly, the user B can hear the second speech of the translation result without disturbance due to the utterance of the first language, and can understand the content of the user A's utterance. As a result, the user B can quickly start the utterance with his/her turn, and the conversation between two users A and B can be smoothly performed.

In the same way, when the user B starts to utter, processing along reverse direction of above-mentioned operation is executed. Briefly, when the first output adjustment device 470 receives an utterance of a second speech (For example, English) from the second speech input device 230 via the network (corresponding to S300), the first output adjustment device 470 reduces a volume of the second speech, and outputs the second speech (having the reduced volume) to the first speech output device 120 of the user terminal A via the network (corresponding to S310).

The second speech recognition unit 420 recognizes the utterance of the second speech. In response to the recognition result, the second machine translation device 440 consecutively generates a translation result with a little delay. Then, the second speech synthesis device 460 generates a first speech (For example, Japanese) of the translation result. Next, it is checked whether the first speech of the translation result exists in the second speech synthesis device 460 (corresponding to S320). If the first speech of the translation result exists, the first output adjustment device 470 adjusts so that a volume of the second speech of the second language is smaller than a volume of the first speech of the translation result (generated by the second speech synthesis device 460), and outputs the first speech (having the adjusted volume) to the user terminal A (100). In the user terminal A (100), the first speech output device 120 receives the second speech (the utterance speech) and the first speech (the translation result), and outputs in order for the user A to hear from a speaker (corresponding to S330). Here, the volume of the second speech is adjusted to be small.

In this operation, by following the utterance speech (having a small volume) of the second language (For example, English) with a little delay, the user A can hear the first speech (having a larger volume) of the translation result of the first language (For example, Japanese) overlapped therewith.

As a result, the user A can hear the utterance speech of the second language of the user B. Accordingly, the user A can naturally perceive that the user B waits the user A's utterance by stopping the user B's utterance. Furthermore, a volume of the utterance speech of the second language is smaller than a volume of the first speech of the translation result. Accordingly, the user A can hear the first speech of the translation result without disturbance due to the utterance of the second language, and can understand the content of the user B's utterance. As a result, the user A can quickly start the utterance with his/her turn, and the conversation between two users A and B can be smoothly performed.

Figure 4:
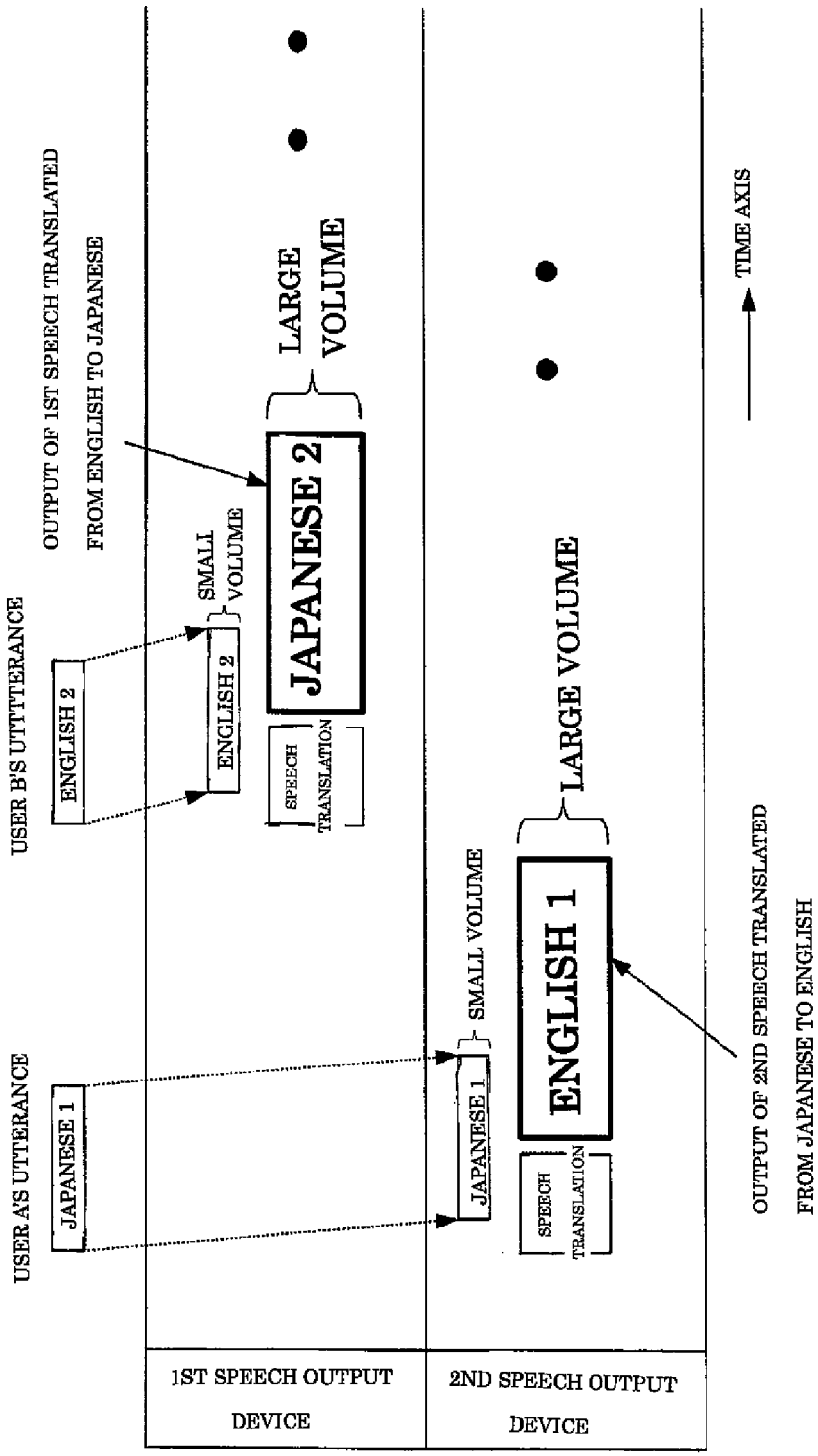
FIG. 4 is a time chart of output speeches according to the first embodiment.

FIG. 4 shows the output speech (in the speech translation system of the first embodiment) represented along a time axis. In a case that a speech (Japanese 1) uttered by the user A is translated and a speech (English 1) of the translation result is provided to the user B, the second output adjustment device 480 adjusts a volume of the utterance speech (Japanese 1) of the first language to be smaller, and adjusts a volume of the second speech (English 1) of the translation result to be larger. The utterance speech (Japanese 1) and the second speech (English 1) are outputted from the second speech output device 240.

On the other hand, in a case that a speech (English 2) uttered by the user B is translated and a speech (Japanese 2) of the translation result is provided to the user A, the first output adjustment device 470 adjusts a volume of the utterance speech (English 2) of the second language to be smaller, and adjusts a volume of the first speech (Japanese 2) of the translation result to be larger. The utterance speech (English 2) and the first speech (Japanese 2) are outputted from the first speech output device 120.

By repeating above-mentioned processing, it is easy for both users A and B to synchronize mutual utterance timing, and communication therebetween can be smoothly performed.

By the way, in the speech translation system of the first embodiment, it is not principally avoided that the first speech or the second speech of the translation result is outputted by delaying from actual utterance speech. Especially, in non-face-to-face speech translation service, the user who utters cannot know how the speech output of the translation result is delayed. Accordingly, in response to the utterance from the user A, if the user B's (the other party) reply utterance is not quickly returned, the user A cannot decide whether delay of the user B's replay is due to the translation processing, or due to the user B's silence because the user A's intension is not correctly transmitted to the user A.

Furthermore, even if the user B starts to reply by correctly transmitting the user A's intension to the user B, the user A feels uneasy about that the user A's intension is not correctly transmitted to the user B. In such case, if the user B's replay is delayed, the user A is irritated, and often continues to utter.

Here, by collision of utterance timing between the user A and the user B, their conversation is not smoothed.

The Second Embodiment

The second embodiment is a method to solve above-mentioned problem. In the second embodiment, in addition to the method of the first embodiment, the user A can hear a speech of a translation result of the user A's utterance at timing when the speech of the translation result is outputted to the user B.

Figure 5:
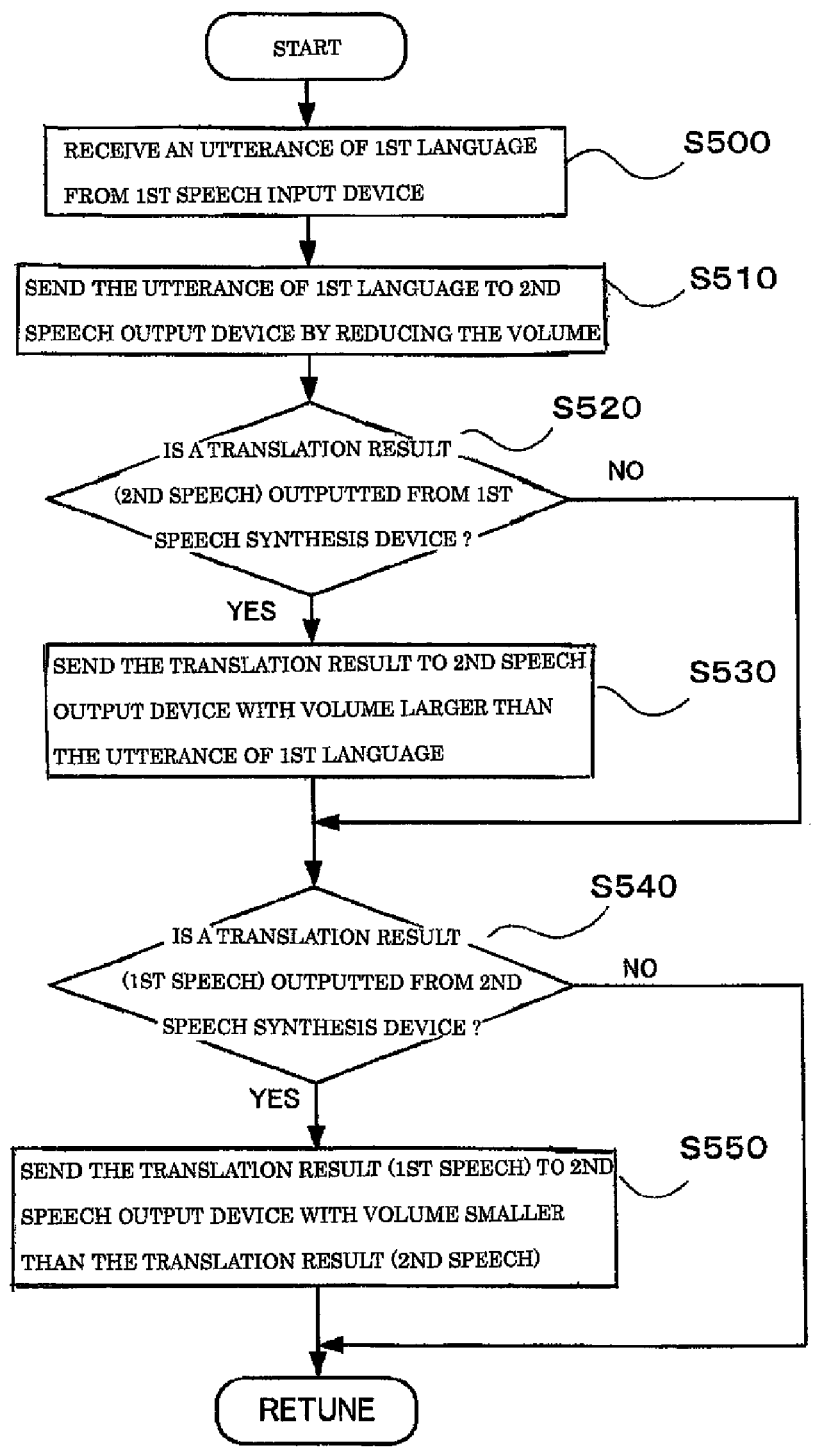
FIG. 5 is a flow chart of operation of the second output adjustment device according to a second embodiment.

FIG. 5 is a flow chart of operation of the second output adjustment device 480 according to the second embodiment.

In FIG. 5, operation of S500-S530 is same as that of FIG. 5. In the second embodiment, at S530, if a second speech (English 1) of the translation result (from the first speech synthesis device 450) is set to be outputted from the first speech output device 120, the first speech output device 120 may output by a volume smaller than the second speech outputted from second speech output device 240.

At S540 newly added, in response to the second language (English 2) uttered from the user B, the second output adjustment device 480 checks whether a first speech (Japanese 2) of the translation result is outputted from the second speech synthesis device 460. If the first speech (Japanese 2) is outputted, the second output adjustment device 480 outputs a second speech (Japanese 2) of the translation result from the second speech output device 240. Here, a volume of the second speech (Japanese 2) is smaller than a volume of a second speech (English 1) of the translation result at S530. After S550, or if the first speech is not outputted at S540, processing is returned, and next speech input is waited.

In this way, when the translation result (Japanese 2) of the user B's utterance speech is outputted from the second speech output device 240, the second output adjustment device 480 adjusts a volume of the translation result (Japanese 2) to be smaller than a volume of the previous translation result (English 1) outputted from the second speech output device 240.

By this processing, each user can simultaneously hear a speech of the translation result of his/her utterance (heard by the other party) with a small volume not disturbing his/her utterance. Accordingly, each user can know completion timing when the content of his/her utterance is transmitted to the other party, i.e., timing to wait a reply from the other party. As a result, the user does not feel easy about delay of reply from the other party accompanied with delay of consecutive translation. Furthermore, collision of their conversation is hard to be occurred, and their conversation can be performed smoothly.

Figure 6:
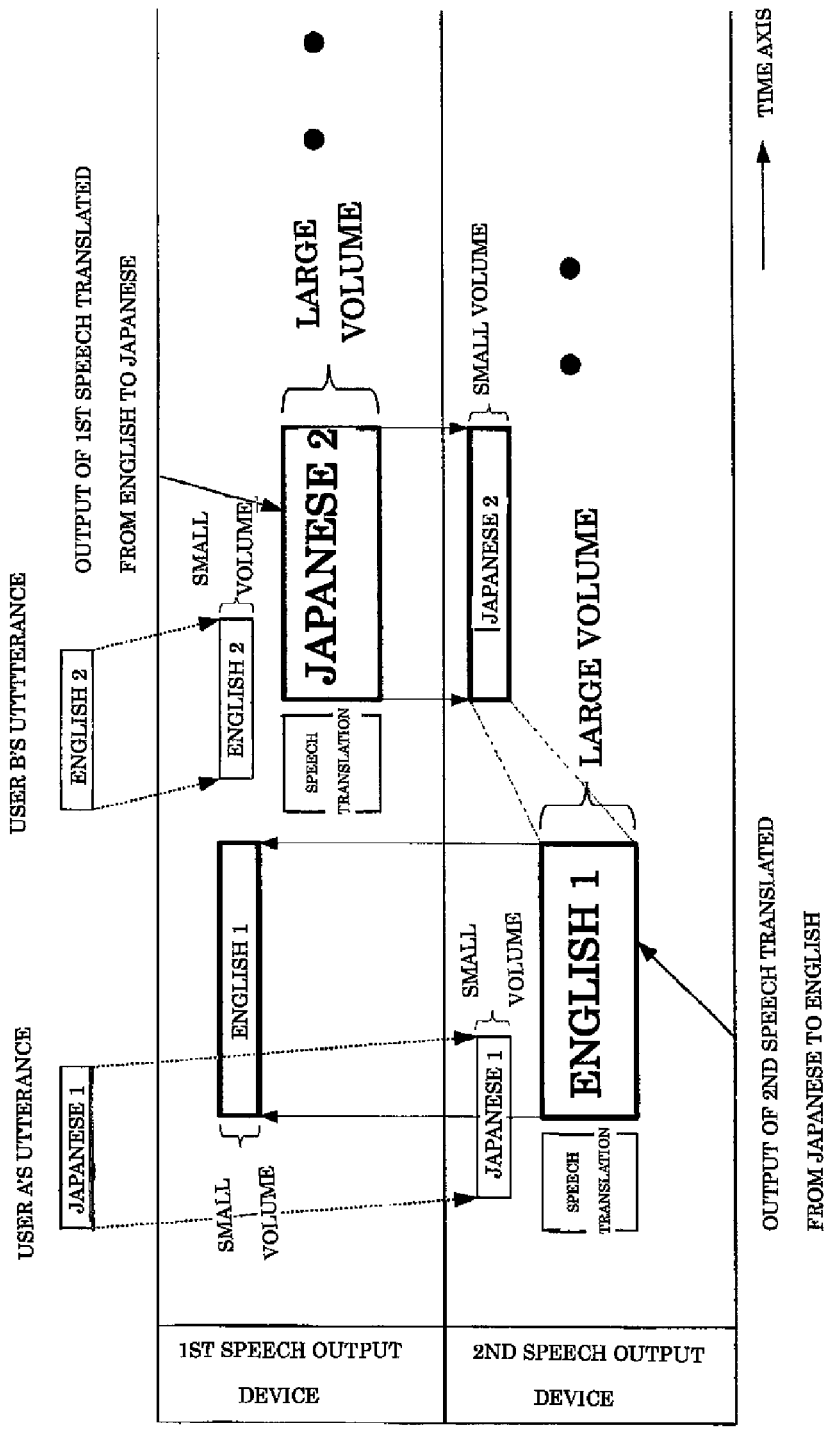
FIG. 6 is a time chart of output speeches according to the second embodiment.

FIG. 6 shows an output speech (in the speech translation system of the second embodiment) represented along a time axis.

When a speech of the first language (uttered by the user A) is recognized/translated, and when a speech of the translation result is provided to the user B, the second output adjustment device 480 adjusts a volume of an utterance speech (Japanese 1) of the first language (to be firstly outputted from the second speech output device 240) to be smaller. Next, the second output adjustment device 480 adjusts a volume of the second speech (English 1) of the translation result (by the first machine translation device 430) to be larger than the utterance speech (Japanese 1). The second speech (English 1) of the translation result is outputted by overlapping with the utterance speech (Japanese 1) from the second speech output device 240.

Furthermore, when the second speech (English 1) of the translation result is outputted from the first speech output device 120, the first output adjustment device 470 adjusts a volume of the second speech to be smaller than a volume of a second speech (English 1) outputted from the second speech output device 240.

Next, when a speech of the second language (uttered by the user B) is recognized/translated, and when a speech of the translation result is provided to the user A, the first output adjustment device 470 adjusts a volume of an utterance speech (English 2) of the second language (to be firstly outputted from the first speech output device 120) to be smaller. Next, the first output adjustment device 470 adjusts a volume of a first speech (Japanese 2) of the translation result (by the second machine translation device 440) to be larger than the utterance speech (English 2) of the second language and a second speech (English 1) of a previous translation result. The first speech (Japanese 2) of the translation result is outputted by overlapping with the utterance speech (English 2) from the first speech output device 120.

Furthermore, when the first speech (Japanese 2) of the translation result is outputted from the second speech output device 240, the second output adjustment device 480 adjusts a volume of the first speech to be smaller than a volume of a first speech (Japanese 2) outputted from the second speech output device 120, and a volume of the second speech (English 1) of the previous translation result.

The Third Embodiment

In the third embodiment, in addition to the second embodiment, a volume of a speech of the translation result of the user's own utterance can be further adjusted finely.

Figure 7:
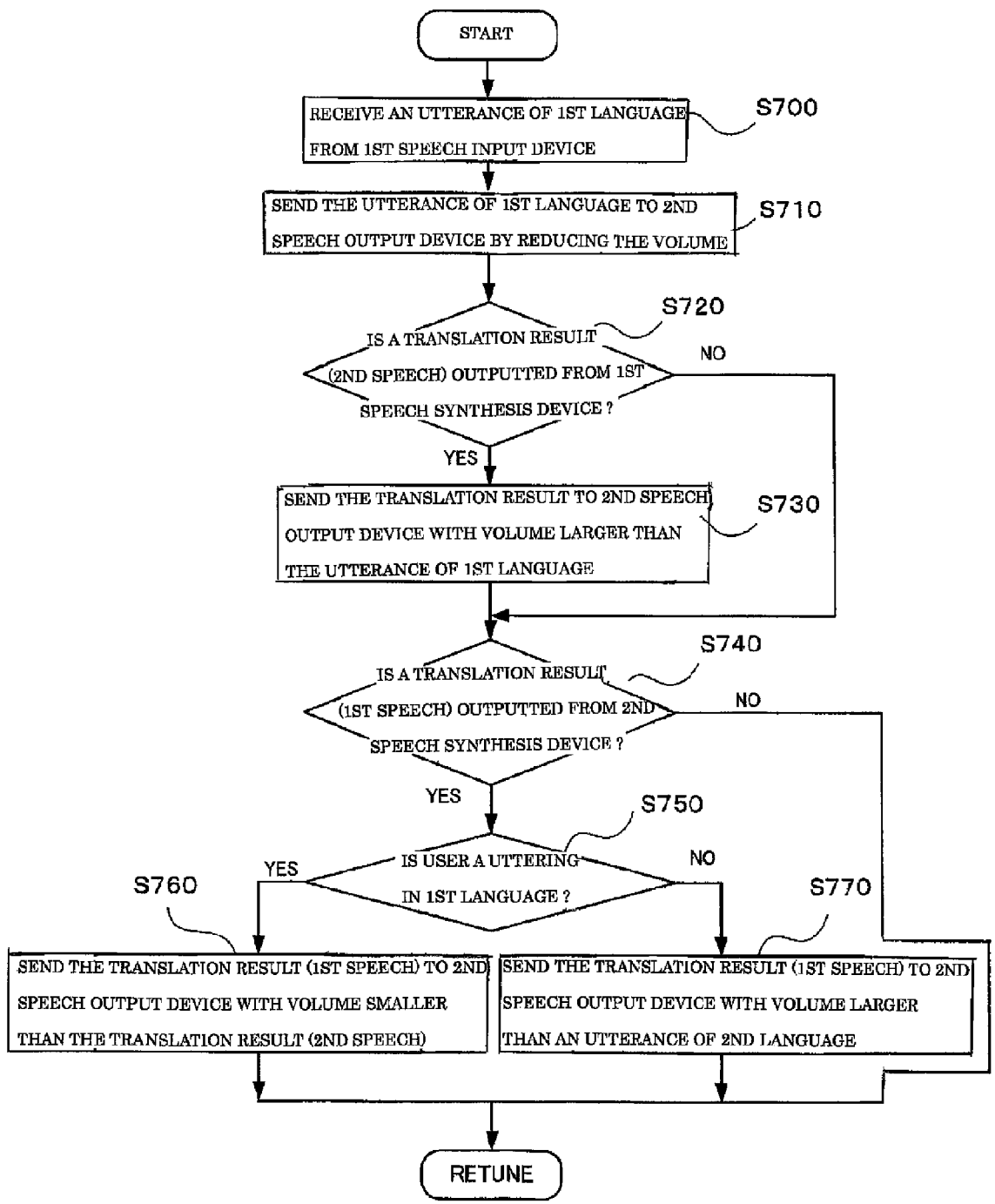
FIG. 7 is a flow chart of operation of the second output adjustment device according to a third embodiment.

FIG. 7 is a flow chart of operation of the second output adjustment device 480 according to the third embodiment.

In FIG. 7, operation of S700-S730 is same as that of FIG. 7. In the third embodiment, at S730, if a second speech (English 1) of the translation result (from the first speech synthesis device 450) is set to be outputted from the first speech output device 120, the first speech output device 120 may output by a volume smaller than the second speech outputted from second speech output device 240. Then, if the user A's utterance speech of the first language does not exist, the second speech (English 1) may be outputted from the first speech output device 120 by changing the small volume to a large volume.

At S740 newly added, in response to the second language (English 2) uttered from the user B, the second output adjustment device 480 checks whether a first speech (Japanese 2) of the translation result is outputted from the second speech synthesis device 460. If the first speech (Japanese 2) is outputted, the second output adjustment device 480 checks whether the user B is uttering in the second language (S750). If the user B is uttering, the second output adjustment device 480 outputs the first speech (Japanese 2) of the translation result from the second speech output device 240. Here, a volume of the first speech (Japanese 2) is smaller than a volume of a second speech (English 1) of the translation result at S730. On the other hand, if the user B is not uttering (S750), the first speech (Japanese 2) is outputted from the second speech output device 240 by changing the small volume to a large volume (S770).

In this way, when the translation result (Japanese 2) of the user B's utterance speech is outputted from the second speech output device 240, if the user B is uttering, the second output adjustment device 480 adjusts a volume of the translation result (Japanese 2) to be smaller than a volume of the previous translation result (English 1) outputted from the second speech output device 240. If the user B is not uttering, the translation result (Japanese 2) is outputted by changing the small volume to a large volume.

In the same way, when the translation result (English 1) of the user A's utterance speech is outputted from the first speech output device 120, if the user A is uttering, the first output adjustment device 470 adjusts a volume of the translation result (English 1) to be smaller than a volume of the previous translation result outputted from the first speech output device 120. If the user A is not uttering, the translation result (English 1) is outputted by changing the small volume to a large volume.

Figure 8:
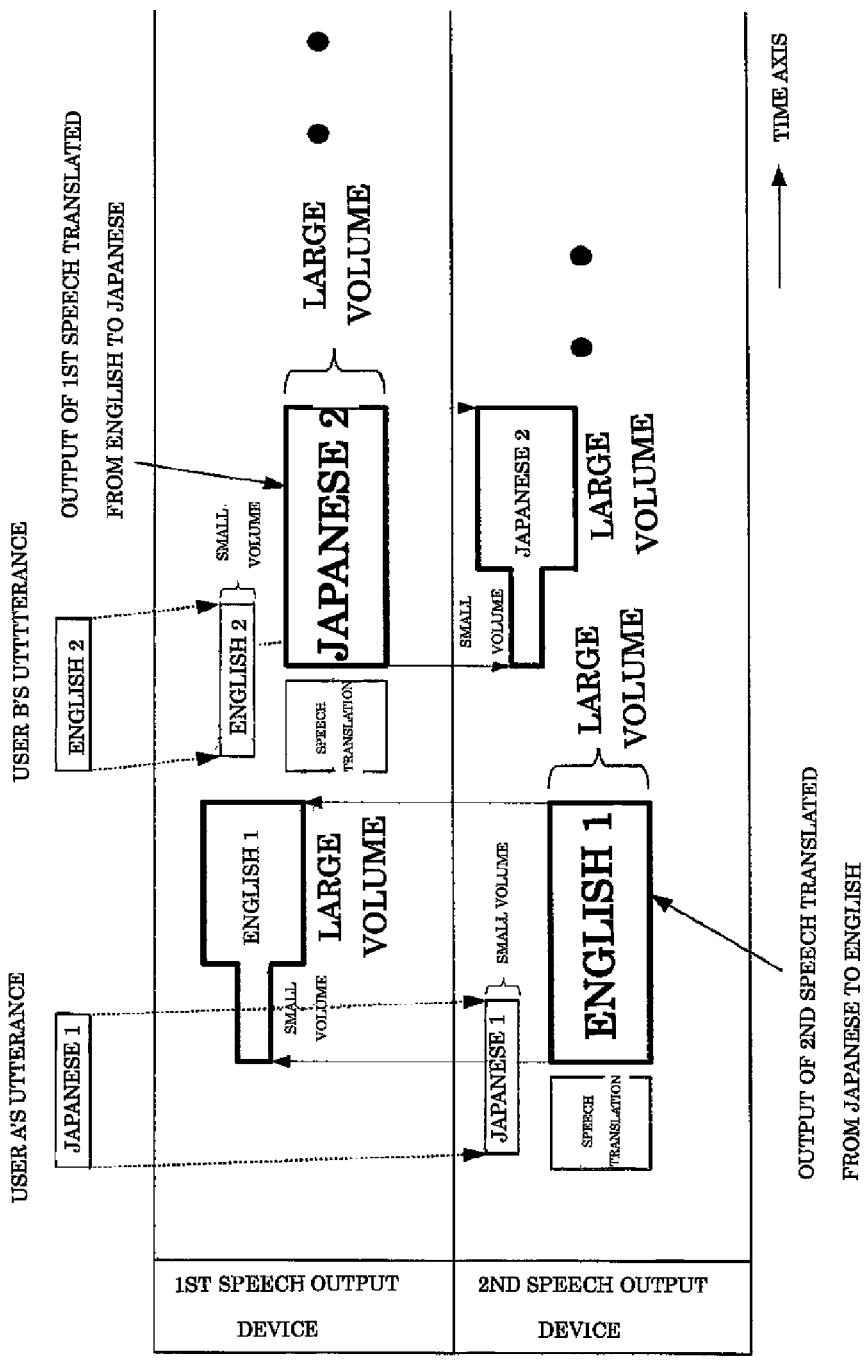
FIG. 8 is a time chart of output speeches according to the third embodiment.

FIG. 8 shows an output speech (in the speech translation system of the third embodiment) represented along a time axis.

When a speech (Japanese 1) of the user A's utterance is recognized/translated, and when a second speech (English 1) of the translation result is provided to the user B, the second output adjustment device 480 adjusts a volume of the utterance speech (Japanese 1) (to be firstly outputted from the second speech output device 240) to be smaller. Next, the second output adjustment device 480 adjusts a volume of the second speech (English 1) of the translation result (by the first machine translation device 430) to be larger than the utterance speech (Japanese 1). The second speech (English 1) of the translation result is outputted by overlapping with the utterance speech (Japanese 1) from the second speech output device 240.

Furthermore, when the second speech (English 1) of the translation result is outputted from the first speech output device 120, if the user A is uttering, the first output adjustment device 470 adjusts a volume of the second speech to be smaller than a volume of the second speech (English 1) outputted from the second speech output device 240. If the user A is not uttering, the second speech (English 1) of the translation result is outputted from the first speech output device 120 by changing the small volume to a large volume.

Next, when a speech (English 2) of the user B's utterance is recognized/translated, and when a first speech (Japanese 2) of the translation result is provided to the user A, the first output adjustment device 470 adjusts a volume of the utterance speech (English 2) (to be firstly outputted from the first speech output device 120) to be smaller. Next, the first output adjustment device 470 adjusts a volume of the first speech (Japanese 2) of the translation result (by the second machine translation device 440) to be larger than the utterance speech (English 2). The first speech (Japanese 2) of the translation result is outputted by overlapping with the utterance speech (English 2) from the first speech output device 120.

Furthermore, when the first speech (Japanese 2) of the translation result is outputted from the second speech output device 240, if the user B is uttering, the second output adjustment device 480 adjusts a volume of the first speech to be smaller than a volume of the utterance speech (English 2) outputted from the first speech output device 120. If the user B is not uttering, the first speech (Japanese 2) of the translation result is outputted from the second speech output device 240 by changing the small volume to a large volume.

By this processing, in comparison with the second embodiment, each user can clearly know completion timing when the content of his/her utterance is transmitted to the other party. Furthermore, collision of their conversation is hard to be occurred, and their conversation can be performed smoothly.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech translation system comprising:
   a first speech apparatus including
      a first speech input device that captures at least a speech of a first language, and
      a first speech output device that outputs another speech of the first language;
   a second speech apparatus including
      a second speech input device that captures at least a speech of a second language, and
      a second speech output device that outputs another speech of the second language; and
   a speech recognition/translation server that performs speech translation between the first speech apparatus and the second speech apparatus;
   wherein the server comprises
      a first speech recognition device that receives a first utterance speech of the first language from the first speech input device, and recognizes the first utterance speech;
      a first machine translation device that consecutively translates the first language of the recognition result into the second language without waiting completion of the first utterance speech;
      a first speech synthesis device that generates a second speech of the translation result; and
      a first output adjustment device that outputs the first utterance speech and the second speech to the second speech output device by adjusting a volume of the first utterance speech to be smaller than a volume of the second speech.

2. The system according to claim 1,
   wherein the server further comprises
      a second speech recognition device that receives a second utterance speech of the second language from the second speech input device, and recognizes the second utterance speech;
      a second machine translation device that consecutively translates the second language of the recognition result into the first language without waiting completion of the second utterance speech;
      a second speech synthesis device that generates a first speech of the translation result; and
      a second output adjustment device that outputs the second utterance speech and the first speech to the first speech output device by adjusting a volume of the second utterance speech to be smaller than a volume of the first speech.

3. The system according to claim 2, wherein
the first output adjustment device outputs the first speech to the second speech output device by adjusting the volume of the first speech to be smaller than the volume of the second speech.

4. The system according to claim 2, wherein
the second output adjustment device outputs the second speech to the first speech output device by adjusting the volume of the second speech to be smaller than the volume of the first speech.

5. The system according to claim 2, wherein,
when completion of the second utterance speech is detected,
the first output adjustment device adjusts the volume of the first speech to be larger than the volume of the second utterance speech being outputted from the first speech output device.

6. The system according to claim 2, wherein,
when completion of the first utterance speech is detected,
the second output adjustment device adjusts the volume of the second speech to be larger than the volume of the first utterance speech being outputted from the second speech output device.

7. The system according to claim 2, wherein
the first output adjustment device outputs the second speech to the first speech output device by adjusting the volume of the second speech to be smaller than the volume of the second speech outputted to the second speech output device.

8. The system according to claim 2, wherein
the second output adjustment device outputs the first speech to the second speech output device by adjusting the volume of the first speech to be smaller than the volume of the first speech outputted to the first speech output device.

9. A method for translating speech in a system comprising
a first speech apparatus including
   a first speech input device that captures at least a speech of a first language, and
   a first speech output device that outputs another speech of the first language;
a second speech apparatus including
   a second speech input device that captures at least a speech of a second language, and a second speech output device that outputs another speech of the second language; and a speech recognition/translation server that performs speech translation between the first speech apparatus and the second speech apparatus;

the method comprising:

receiving by the server, a first utterance speech of the first language from the first speech input device;

recognizing by the server, the first utterance speech;

consecutively translating by the server, the first language of the recognition result into the second language without waiting completion of the first utterance speech;

generating by the server, a second speech of the translation result;

adjusting by the server, a volume of the first utterance speech to be smaller than a volume of the second speech; and outputting by the server, the second speech overlapped with the first utterance speech to the second speech output device.

10. The method according to claim 9, further comprising:

receiving by the server, a second utterance speech of the second language from the second speech input device;

recognizing by the server, the second utterance speech;

consecutively translating by the server, the second language of the recognition result into the first language without waiting completion of the second utterance speech;

generating by the server, a first speech of the translation result;

adjusting by the server, a volume of the second utterance speech to be smaller than a volume of the first speech; and outputting by the server, the first speech overlapped with the second utterance speech to the first speech output device.

11. A non-transitory computer readable medium for causing a computer to perform operations for translating speech in a system comprising a first speech apparatus including a first speech input device that captures at least a speech of a first language, and a first speech output device that outputs another speech of the first language;

a second speech apparatus including a second speech input device that captures at least a speech of a second language, and a second speech output device that outputs another speech of the second language; and a speech recognition/translation server that performs speech translation between the first speech apparatus and the second speech apparatus;

the operations comprising:

receiving by the server, a first utterance speech of the first language from the first speech input device;

recognizing by the server, the first utterance speech;

consecutively translating by the server, the first language of the recognition result into the second language without waiting completion of the first utterance speech;

generating by the server, a second speech of the translation result;

adjusting by the server, a volume of the first utterance speech to be smaller than a volume of the second speech; and outputting by the server, the second speech overlapped with the first utterance speech to the second speech output device.

12. The non-transitory computer readable medium, the operations further comprising:

receiving by the server, a second utterance speech of the second language from the second speech input device;

recognizing by the server, the second utterance speech;

consecutively translating by the server, the second language of the recognition result into the first language without waiting completion of the second utterance speech;

generating by the server, a first speech of the translation result;

adjusting by the server, a volume of the second utterance speech to be smaller than a volume of the first speech; and outputting by the server, the first speech overlapped with the second utterance speech to the first speech output device.

* * * * *